May 23, 1961  J. A. DINSMORE  2,985,493
ELECTRIC MOTOR BEARING
Filed July 18, 1957
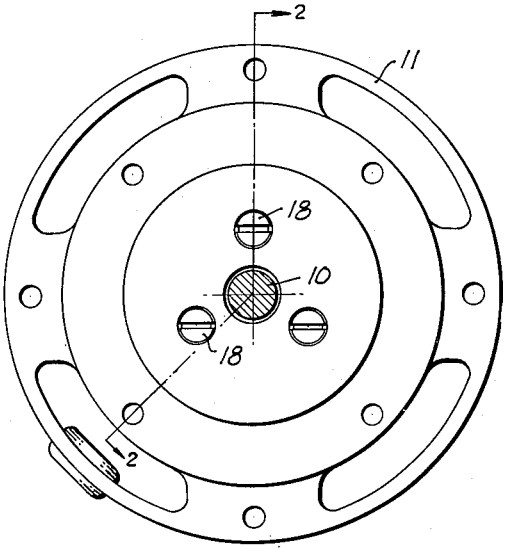
FIG_1_
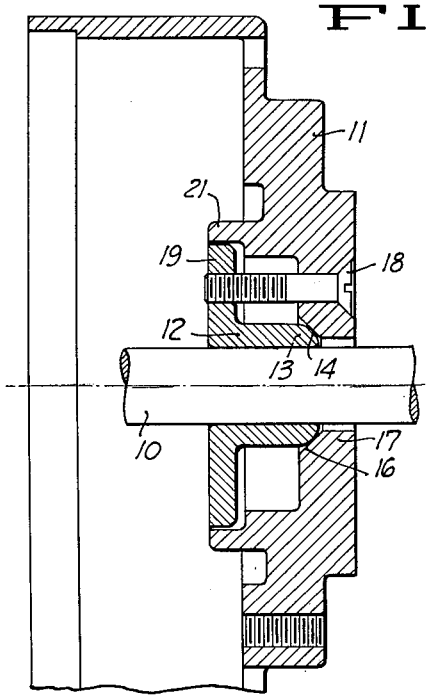
FIG_2_
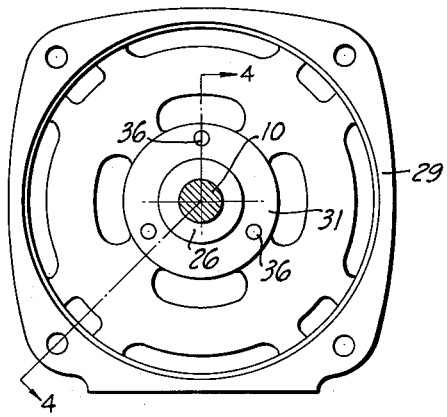
FIG_3_
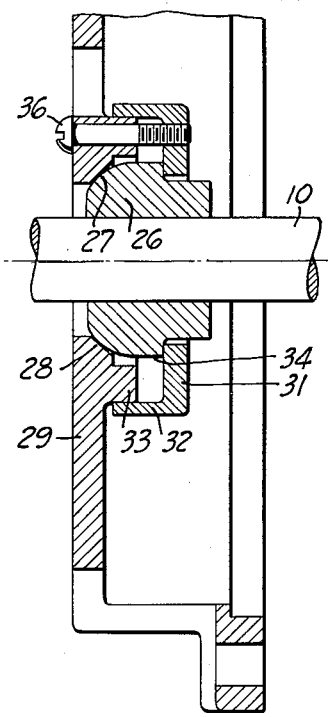
FIG_4_
INVENTOR.
Joseph A. Dinsmore
BY
ATTORNEYS United States Patent Office 2,985,493
Patented May 23, 1961

2,985,493
ELECTRIC MOTOR BEARING
Joseph A. Dinsmore, San Carlos, Calif., assignor to Ampex Corporation, Redwood City, Calif., a corporation of California
Filed July 18, 1957, Ser. No. 672,671
4 Claims. (Cl. 308—22)

This invention relates generally to the construction of shaft bearings, and more particularly to the shaft bearings of electric motors.

In many instances the alignment of shaft bearings is important to the proper operation of various devices, such as specialized electric motors or motor driven shafts. For example, in instances where the bearings are in the form of porous metal bushings, and the device is intended for critical services such as the driving of parts of magnetic tape machines, even slight bearing misalignment interferes with proper smooth operation. One construction which has been used in an effort to solve this problem is to provide a bearing member held in place by spring means and retained in such a manner as to permit self-aligning movement. Such an arrangement has been found unsatisfactory, particularly because continuous self-aligning movement of the bearings, even though slight, interferes with proper smooth operation, and tends to make the device noisy.

In general it is an object of the present invention to provide a bearing construction for shafts which will permit accurate fixing of a bearing member in a desired aligned position with respect to the shaft, at the time the motor is factory assembled.

Another object of the invention is to provide a bearing construction of the above character which is simple in its construction, and which can be readily fixed in a desired position of accurate alignment.

Additional objects and features of the invention will appear from the following description in which the preferred embodiments have been set forth in detail in conjunction with the accompanying drawing.

Referring to the drawing:

Figure 1 is a front view illustrating a bearing construction in accordance with the present invention.

Figure 2 is an enlarged cross sectional view taken along the line 2—2 of Figure 1.

Figure 3 is a view like Figure 1 but showing another embodiment.

Figure 4 is an enlarged cross sectional view taken along the line 4—4 of Figure 3.

In Figures 1 and 2 I have shown the shaft 10 of an electric motor, together with a portion of the motor housing 11. The annular bearing member 12 in which the shaft is journaled represents the bearing for the power take-off end of the shaft, and may be of the oilite type, or in other words made of compressed metal with a porosity capable of retaining lubricating oil. The bore through such a bearing member is accurately made in a die forming operation, and is not subject to machining or grinding for greater accuracy. The annular end portion 13 of the bushing is provided with a surface 14 adapted to abut the annular surface 16 on the housing portion 17. One of the surfaces 14 or 16 conforms to the surface of a sphere having a center coincident with the center of the bushing. It is convenient in this connection to make the surface 14 on the bearing member conform to a spherical surface, and to make the surface 16 correspond to the surface of a cone.

Means are provided for tightly clamping the bearing member against the housing, thereby fixing the bearing member in a desired adjustment. The clamping means in this instance consists of a plurality of (preferably 3) clamping screws 18 which extend through the housing, and which have threaded engagement with the flange 19 on the inner end of the bearing member. The flange 19 is loosely accommodated within the annular rib or flange 21, forming a part of the housing. This permits limited aligning movement of the flange and the bearing member relative to the housing.

When all of the screws 18 have been tightened, the bearing member 12 is clamped against the housing portion 17 and is retained in a fixed position of alignment. However by adjusting the screws 18 this alignment can be adjusted in any direction about the center of the bore, thus permitting the bearing member to be fixed in precise alignment with a particular shaft. The alignment is permitted by slight flexure of the portion of the screw extending between the housing and the flange 19. It is apparent that if greater movement of the screws is desired, they may be inserted through an enlarged opening.

When a motor and its bearings are assembled at the factory, initially both sets of clamping screws 18 are left loose whereby the bearing member has limited self-aligning action. By means of a suitable electrical measuring instrument, such as a wattmeter, the power consumption of the motor is noted, and the screws 18 for the bearing member are gradually tightened to clamp the bearing member in a fixed position of fixed alignment. If this fixed position is not precisely in alignment with the shaft, the power consumption of the motor is noticeably increased. When the bearing is fixed in a position in which the power consumption is at a minimum, it is accurately aligned.

Although in some instances the bearing means at the other end of the shaft may be of conventional construction, it is generally desirable to employ a second adjustable assembly made the same as the bearing means just described.

In the embodiment of Figures 3 and 4, the bearing member 26 likewise has a spherical surface 27 adapted to abut the conical surface 28 on the housing portion 29. Instead of providing the bearing member with a flange, corresponding to the flange 19 of Figure 2, the bearing member is engaged by the collar 31. The rim 32 on this collar loosely surrounds an annular rib 33 on the housing. The inner peripheral edge of the collar engages an annular shoulder 34 on the bearing member. Clamping screws 36, preferably three in number, serve to clamp the bearing member against surface 28 on the housing.

The embodiment of Figures 3 and 4 operates in substantially the same manner as the embodiment of Figures 1 and 2. Here again it is a simple matter to fix the bearing member in a desired position of alignment.

It will be evident from the foregoing that I have provided a bearing construction making possible the use of bearing members of the oilite type, and which permits the fixing of the bearing members in a desired position of alignment with respect to the motor shaft. The adjustments to secure desired alignment are quite simple, and can be readily carried out during factory assembly. Motors equipped with my bearings are characterized by smooth operation with a minimum amount of power loss and noise. In addition to its use on motors, it can be employed with shafts where precision journalling is desired, as for example, the shaft forming the tape driving capstan of a magnetic tape recorder. In such event some other structure or mounting means takes the place of the motor housing.

I claim:

1. In a shaft-bearing assembly, mounting means adapted to accommodate a shaft, an annular bearing member in which the shaft is journalled, an end portion of the bearing member having a surface adapted to abut a surface formed on an annular portion of the mounting means surrounding the shaft, one of said abutting surfaces corresponding generally to the surface of a sphere, and means which effect aligning movements of said bearing member and for releasably clamping the member against said portion of the mounting means to thereby fix the same in a desired position of alignment, said last means comprising a plurality of clamping members engaging the mounting and distributed about the bearing member, and means engaged by said clamping members and carried by the bearing member in fixed relationship to the axis of the same, said last means serving to transmit clamping forces from said clamping members to said bearing member and to fix the axial alignment of the bearing member according to the individual settings of the clamping members.

2. A shaft-bearing assembly as in claim 1 in which the clamping members comprise three circumferentially spaced clamping screws.

3. A bearing assembly as in claim 1 in which said means engaged by said clamping member consist of a flange fixed on the bearing member and engaged by said clamping members.

4. A bearing assembly as in claim 1 in which said means engaged by said clamping members consist of a collar seated on a shoulder formed on the bearing member.

References Cited in the file of this patent

UNITED STATES PATENTS

| | | |
|---|---|---|
| 862,216 | Thompson | Aug. 6, 1907 |
| 1,067,892 | Walters | July 22, 1913 |
| 1,270,244 | Watts et al. | June 18, 1918 |

FOREIGN PATENTS

| | | |
|---|---|---|
| 967,579 | France | Mar. 29, 1950 |